(12) United States Patent
Zhao et al.

(10) Patent No.: US 9,791,639 B2
(45) Date of Patent: Oct. 17, 2017

(54) OPTICAL FIBER CONNECTOR ASSEMBLY, OPTICAL FIBER CONNECTOR PLUG, AND ADAPTER ASSEMBLY

(71) Applicant: ZTE Corporation, Shenzhen, Guangdong (CN)

(72) Inventors: Guo Zhao, Shenzhen (CN); Xiaojian Cao, Shenzhen (CN); Yunpeng Xie, Shenzhen (CN); Xiangyong Hao, Shenzhen (CN); Lei Zhou, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 14/768,418

(22) PCT Filed: Aug. 19, 2013

(86) PCT No.: PCT/CN2013/081798
§ 371 (c)(1),
(2) Date: Aug. 17, 2015

(87) PCT Pub. No.: WO2013/189370
PCT Pub. Date: Dec. 27, 2013

(65) Prior Publication Data
US 2016/0004017 A1 Jan. 7, 2016

(30) Foreign Application Priority Data
Feb. 18, 2013 (CN) .................. 2013 2 0075344 U

(51) Int. Cl.
*G02B 6/36* (2006.01)
*G02B 6/38* (2006.01)

(52) U.S. Cl.
CPC ........... *G02B 6/3895* (2013.01); *G02B 6/387* (2013.01); *G02B 6/3817* (2013.01); *G02B 6/3825* (2013.01); *G02B 6/3897* (2013.01)

(58) Field of Classification Search
CPC .. G02B 6/3897; G02B 6/4452; G02B 6/4292; G02B 6/4453; G02B 6/3825;
(Continued)

(56) References Cited

U.S. PATENT DOCUMENTS 5,940,563 A 8/1999 Kobayashi
8,215,972 B2 7/2012 Wang
(Continued)

FOREIGN PATENT DOCUMENTS

CN 101968558 A 2/2011
CN 101982797 A 3/2011
(Continued)

OTHER PUBLICATIONS

International Search Report in international application No. PCT/CN2013/081798, mailed on Dec. 5, 2013.
(Continued)

*Primary Examiner* — Kaveh C Kianni
*Assistant Examiner* — Hung Lam
(74) *Attorney, Agent, or Firm* — Oppedahl Patent Law Firm LLC

(57) ABSTRACT

Disclosed are an optical fiber connector assembly, an optical fiber connector plug, and an adapter assembly, comprising an optical fiber connector plug, an optical fiber connector adapter, and an adapter base plate. A plug information storage chip and an indicator light-guiding pillar are arranged in parallel on a bottom side of the optical fiber connector plug. Each pin of the plug information storage chip is electrically connected to conductive slide-rails. Metal elastic pins and an indicator light accommodation portion are arranged in parallel on a bottom side of a plug opening of the optical fiber connector adapter. Pin contacts and an indicator light are arranged in parallel on the adapter base plate. When the adapter is mounted on the adapter base
(Continued)

plate, the indicator light is accommodated in the indicator light accommodation portion and the metal elastic pins are electrically connected to the pin contacts. When the plug is inserted into the adapter mounted on the adapter base plate, the metal elastic pins are electrically connected to the conductive slide-rails, and the indicator light-guiding pillar is inserted into the indicator light accommodation portion and abuts against the indicator light. The embodiments of the disclosure effectively prevent false insertion of a port.

7 Claims, 5 Drawing Sheets

(58) Field of Classification Search
CPC .. G02B 6/3817; G02B 6/4261; G02B 6/3895; G02B 6/387; G02B 6/4219; H05K 5/0026; H05K 7/1487; H05K 1/0274; H05K 1/1421
USPC ........................ 385/65, 76, 89, 92, 135, 139
See application file for complete search history.

(56) References Cited

U.S. PATENT DOCUMENTS

| | | |
|---|---|---|
| 2004/0105325 A1 | 6/2004 | Sago |
| 2004/0240807 A1 | 12/2004 | Frohlich |
| 2007/0015416 A1* | 1/2007 | Gutierrez ............... H01R 24/64 439/676 |
| 2011/0263149 A1 | 10/2011 | Wang |
| 2011/0274437 A1 | 11/2011 | Jones |
| 2011/0305422 A1 | 12/2011 | Thompson |
| 2014/0023328 A1* | 1/2014 | Lambourn ............... G02B 6/42 385/92 |

FOREIGN PATENT DOCUMENTS

| | | |
|---|---|---|
| CN | 201926780 U | 8/2011 |
| CN | 202305896 U | 7/2012 |
| CN | 102870022 A | 1/2013 |
| CN | 203117468 U | 8/2013 |
| DE | 10209342 A1 | 9/2003 |
| DE | 102010020694 A1 | 11/2011 |
| FR | 2847392 A1 | 5/2004 |
| WO | 02097502 A1 | 12/2002 |

OTHER PUBLICATIONS

English Translation of the Written Opinion of the International Search Authority in international application No. PCT/CN2013/081798, mailed on Dec. 5, 2013.
Supplementary European Search Report in European application No. 13806760.8, mailed on Feb. 5, 2016.

* cited by examiner

OPTICAL FIBER CONNECTOR ASSEMBLY, OPTICAL FIBER CONNECTOR PLUG, AND ADAPTER ASSEMBLY

TECHNICAL FIELD

The disclosure relates to communications technology, and more particularly, to an optical fiber connector assembly, an optical fiber connector plug, and an adapter assembly.

BACKGROUND

With development of optical fiber communications, there are numerous optical fibers and optical cables to be arranged in a communication network. Connection states, connection relationships and smart management of the optical fibers and optical cables become more and more important in the face of large scale massive fiber optical networks, a great variety of optical wiring equipments, frequent and urgent on-off for optical fiber networks, and maintenance requirements from customers. Therefore, an optical fiber connector, as an important unit of connection among the optical fibers and the optical cables, also gets more and more attention.

Currently, there are many types of universal optical fiber connectors in the optical fiber network, such as a Square Connector (SC), a Lucent Connector (LC), a Ferrule Connector (FC), a Stab & Twist (ST) connector and etc. The SC type of optical fiber connector has a rectangular shell, and is fixed in a plug-pull coupling way. A guide raised key with a semi-circular front end and a square back end is on a side of a shell of the SC type of optical fiber connector plug. A convex shape of bayonet window is on each of two sides of the guide raised key. This bayonet window is composed of two arc invaginated outer shell guide rails and one inner shell boss. The SC type of adapter has symmetrical guide grooves at two ports and two bayonet barbs with a cylindrical pin abutting cavity between them. When the guide raised key on the SC type of optical fiber connector plug is inserted into the SC type of adapter along the guide grooves of the SC type of adapter, the bayonet barbs in the SC type of adapter may hook the bosses in the bayonet windows of the SC type of optical fiber connector plug, thereby locking the SC type of optical fiber connector plug and the adapter. When the guide raised key on the SC type of optical fiber connector plug is pulled out of the adapter along the guide grooves of the SC type of adapter, the arc guide rails on the bayonet windows on two sides of the SC type of optical fiber connector plug slowly support the bayonet barbs in the SC type of adapter, and thus the bayonet barbs are broken away from the bosses in the bayonet windows of the SC type of optical fiber connector plug, thereby separating the SC type of optical fiber connector plug from the adapter. The LC type of optical fiber connector adopts an operation modularization snap coupling mechanism. The FC type of optical fiber connector adopts a metal ferrule for outside enhancement, and is fixed in a screw coupling way. The ST type of optical fiber connector has a circular shell, and is fixed in a screw coupling way.

When the universal optical fiber connector such as the SC, the LC, the FC, the ST, and etc., is used in the same network for connection among optical fibers and optical cables, the shape, the colour, the structure, and the like of the optical fiber connector, the adapter, the optical cable, and etc. are almost the same. Meanwhile, in most of current identification methods, a paper or plastic label is used and fastened to an optical cable or a tail end of a joint by means of glue or a fixation string. Because of connection environment, frequent operation and maintenance as well as time lapse, an attached label is easily fell off and/or aged. Further, it may be identified by mistake, and may not be dealt with in time on scene, and therefore this method cannot achieve effective identification on a link or a port. Moreover, during the start-up and maintenance process, there is no accurate connection indication between the ports. It is easy to insert a wrong plug. Once the plug is falsely inserted, it is very difficult to find out.

Currently, there is a new connector assembly for preventing false insertion on the market. This assembly has a plug opening for accommodating a front end of the optical fiber connector plug. The front end of the optical fiber connector plug has a plug section for matching with the plug opening. A plug information storage chip is fixedly arranged on the optical fiber connector plug. All pins of the plug information storage chip are electrically connected to metal conductors. A metal elastic member touching against the metal conductors when plugging is provided on the optical fiber connector adapter. The metal elastic member is used to electrically connect to a signal input end of a system main board. An indicator light is further provided on the optical fiber connector adapter, and is used to electrically connect to a signal output end of the system main board. When plugging, plug information in the plug information storage chip is input to the system main board through metal conductors and the metal elastic member. If the information is matched, then the indicator light is lightened; otherwise, the indicator light is not lightened. Thus, false insertion is prevented between two or more optical fiber connector assemblies.

However, this method for preventing false insertion requires a plug member which can match with the universal SC type and/or LC type plugs, and thus such a structure is relatively complicated. Meanwhile, the indicator light of the adapter is subject to be blocked by an optical fiber, and an indication effect is bad. In addition, in-position information detection cannot be performed on a traditional SC, and thus a plug of a non-matched SC cannot be identified.

SUMMARY

In view of the above problems, an embodiment of the disclosure is proposed to provide an optical fiber connector assembly, an optical fiber connector plug, and an adapter assembly, which can overcome the above problems or at least partly solve the above problems.

An embodiment of the disclosure provides an optical fiber connector assembly, which includes an optical fiber connector plug, an optical fiber connector adapter, and an adapter base plate. The optical fiber connector adapter is installed on the adapter base plate, and the optical fiber connector adapter has a plug opening by which the optical fiber connector plug is inserted into the optical fiber connector adapter.

A plug information storage chip and an indicator light light-guiding pillar are provided in parallel on a bottom side of the optical fiber connector plug. All pins of the plug information storage chip are electrically connected with conductive slide rails.

Metal elastic pins and an indicator light accommodation portion are provided in parallel on a side of the plug opening of the optical fiber connection adapter which matches with a bottom side of the plug.

Pin contacts and an indicator light are provided in parallel on the adapter base plate. The pin contacts are connected to an input end of an external microprocessor, and the indicator light is connected to an output end of the microprocessor.

When the optical fiber connector adapter is installed on the adapter base plate, the indicator light is accommodated in the indicator light accommodation portion, and the metal elastic pins are electrically connected to the pin contacts. When the optical fiber connector adapter plug is inserted in the optical fiber connector adapter installed on the adapter base plate, the metal elastic pins are electrically connected to the conductive slide rails, and the indicator light light-guiding pillar is inserted into the indicator light accommodation portion and abuts against the indicator light.

Optionally, in the embodiment of the disclosure, the plug information storage chip and the conductive slide rails may be deployed on a printed circuit board provided on the bottom side of the optical fiber connector plug. The plug information storage chip may be deployed on one side of the printed circuit board, and the conductive slide rails may be deployed on the other side of the printed circuit board. The pins of the plug information storage chip may be electrically connected to the conductive slide rails through the printed circuit board.

Optionally, in the embodiment of the disclosure, an invaginated hollow boss i may be provided on the bottom side of the optical fiber connector plug, and the printed circuit board deployed with the plug information storage chip and the conductive slide rails may be fixed in the hollow boss.

Optionally, in the embodiment of the disclosure, invaginated guide slots may be provided on the hollow boss at places which match with the conductive slide rails, and may be used to guide the metal elastic pins to abut against the conductive slide rails when the optical fiber connector plug is inserted into the optical fiber connector adapter.

Optionally, in the embodiment of the disclosure, the optical fiber connector plug may include a plug shell. Both the hollow boss and the indicator light-guiding pillar may be provided on the plug shell. Alternatively, the hollow boss may be provided on the plug shell, and the indicator light-guiding pillar may be fixed on a sheath of the plug.

Optionally, in the embodiment of the disclosure, a plug in-position detection portion may be further provided on the adapter base plate and is connected to the input end of the microprocessor. A reservation hollow may be further provided on the optical fiber connector adapter. When the optical fiber connector adapter is installed on the adapter base plate, the plug in-position detection portion enters the optical fiber connector adapter through the reservation hollow, and when the optical fiber connector plug is inserted into the optical fiber connector adapter, the plug in-position detection portion is triggered.

Optionally, in the embodiment of the disclosure, the plug information storage chip may be an Electrically Erasable Programmable Read-Only Memory (EEPROM).

An embodiment of the disclosure further provides an optical fiber connector plug, on a bottom side of which a plug information storage chip and an indicator light-guiding pillar are provided in parallel. All pins of the plug information storage chip are electrically connected with conductive slide rails.

Optionally, in the embodiment of the disclosure, the plug information storage chip and the conductive slide rails may be provided on a printed circuit board on a bottom side of the optical fiber connector plug. The plug information storage chip may be deployed on one side of the printed circuit board, and the conductive slide rails may be deployed on the other side of the printed circuit board. The pins of the plug information storage chip may be electrically connected to the conductive slide rails through the printed circuit board.

Optionally, in the embodiment of the disclosure, an invaginated hollow boss may be provided on the bottom side of the optical fiber connector plug, and the printed circuit board deployed with the plug information storage chip and the conductive slide rails may be accommodated in the hollow boss.

Optionally, in the embodiment of the disclosure, invaginated guide slots for matching with the conductive slide rails may be provided on the hollow boss, and may be used to guide metal elastic pins located on the adapter to abut against the conductive slide rails when the optical fiber connector plug is inserted into the optical fiber connector adapter.

Optionally, in the embodiment of the disclosure, the optical fiber connector plug may include a plug shell. Both the hollow boss and the indicator light-guiding pillar are provided on the plug shell. Alternatively, the hollow boss is provided on the plug shell, and the indicator light-guiding pillar is fixed on a sheath of the plug.

An embodiment of the disclosure further provides an optical fiber connector adapter assembly configured to be inserted into by the optical fiber connector plug described in the embodiment of the disclosure, which may include an optical fiber connector adapter and an adapter base plate. The optical fiber connector adapter is installed on the adapter base plate, and has a plug opening by which the optical fiber connector plug is inserted into the optical fiber connector adapter.

Metal elastic pins and an indicator light accommodation portion are provided in parallel on a bottom side of the plug opening of the optical fiber connector adapter.

Pin contacts and an indicator light are provided in parallel on the adapter base plate. The pin contracts are connected to an input end of an external microprocessor, and the indicator light is connected to an output end of the microprocessor.

When the optical fiber connector adapter is installed on the adapter base plate, the indicator light is accommodated in the indicator light accommodation portion, and the metal elastic pins are electrically connected to the pin contacts. When the optical fiber connector plug is inserted into the optical fiber connector adapter installed on the adapter base plate, the metal elastic pins are electrically connected to the conductive slide rails of the optical fiber connector plug, and an indicator light-guiding pillar arranged on the optical fiber connector plug is inserted into the indicator light accommodation portion, and abuts against the indicator light.

Optionally, in the embodiment of the disclosure, a plug in-position detection portion is further provided on the adapter base plate and is connected to the input end of the microprocessor. A reservation hollow is further provided on the optical fiber connector adapter. When the optical fiber connector adapter is installed on the adapter base plate, the plug in-position detection portion enters the optical fiber connection adapter through the reservation hollow. When the optical fiber connector plug is inserted into the optical fiber connector adapter, the plug in-position detection portion is triggered.

According to the disclosure, the following advantages are presented.

The technical solution according to an embodiment of the disclosure, compared with the existing technology, implements an identification and positioning of a port of an optical fiber connector by means of a plug information storage chip, simplifies a design module of a complicated connector, facilitates and speeds up progress of the optical fiber network port identification, achieves such an effect as accurate positioning and identification, quick operation and the like, saves the time for network start-up, failure check and processing and the like, and improves quality of an optical fiber communication network.

DETAILED DESCRIPTION

Figure 1:
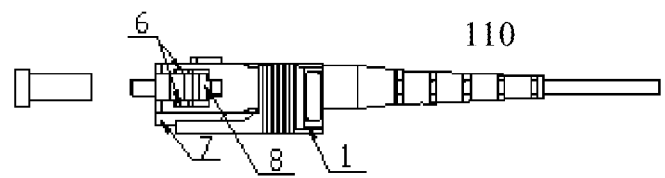
FIG. 1 is a main view of an optical fiber connector plug provided with a plug information storage chip according to an embodiment of the disclosure.
Figure 2:
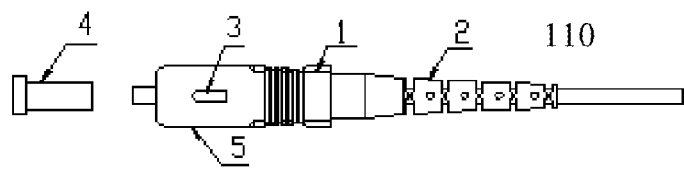
FIG. 2 is a top view of the optical fiber connector plug provided with the plug information storage chip according to an embodiment of the disclosure.
Figure 3:
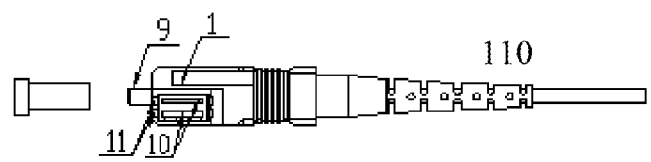
FIG. 3 is a bottom view of the optical fiber connector plug provided with the plug information storage chip according to an embodiment of the disclosure.
Figure 4:
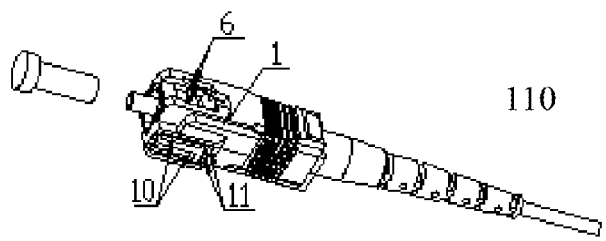
FIG. 4 is a stereogram of the optical fiber connector plug provided with the plug information storage chip according to an embodiment of the disclosure.
Figure 5:
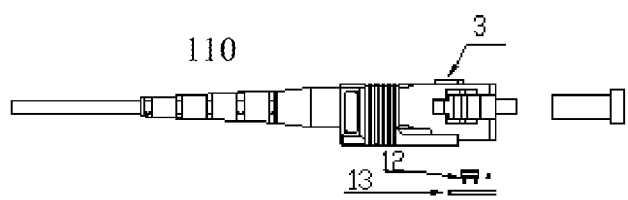
FIG. 5 is an exploded main view of the optical fiber connector plug provided with the plug information storage chip and the plug information storage chip according to an embodiment of the disclosure.
Figure 6:
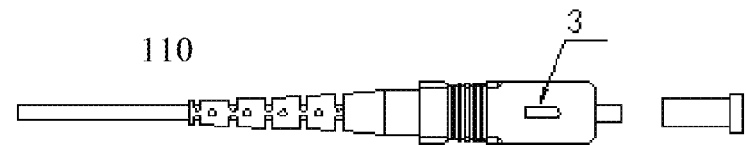
FIG. 6 is an exploded top view of the optical fiber connector plug provided with the plug information storage chip and the plug information storage chip according to an embodiment of the disclosure.
Figure 7:
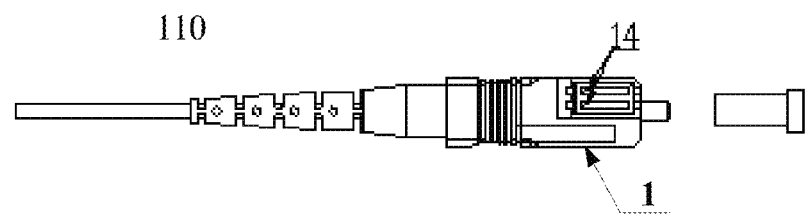
FIG. 7 is an exploded bottom view of the optical fiber connector plug provided with the plug information storage chip and the plug information storage chip according to an embodiment of the disclosure.
Figure 8:
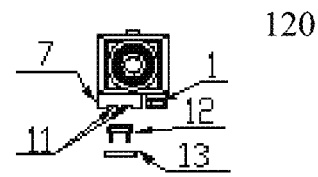
FIG. 8 is an exploded right view of the optical fiber connector plug provided with the plug information storage chip and the plug information storage chip according to an embodiment of the disclosure.
Figure 9:
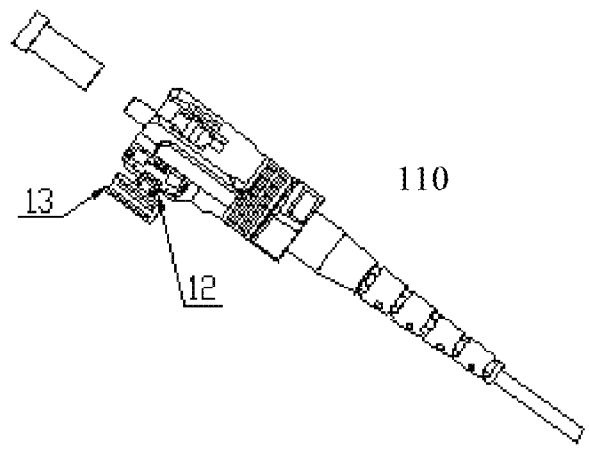
FIG. 9 is an exploded stereogram of the optical fiber connector plug provided with the plug information storage chip and the plug information storage chip according to an embodiment of the disclosure.
Figure 10:
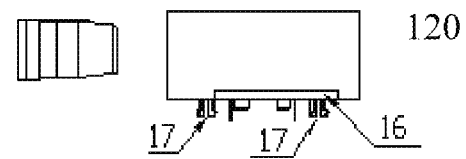
FIG. 10 is a main view of an optical fiber connector adapter according to an embodiment of the disclosure.
Figure 11:
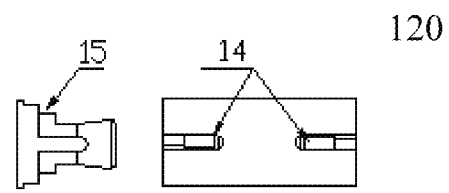
FIG. 11 is a top view of an optical fiber connector adapter according to an embodiment of the disclosure.
Figure 12:
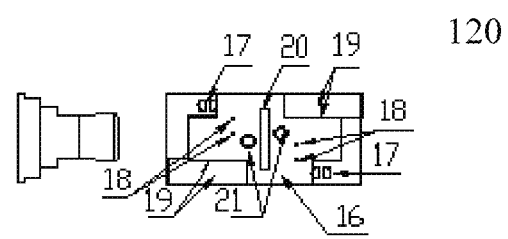
FIG. 12 is a bottom view of an optical fiber connector adapter according to an embodiment of the disclosure.
Figure 13:
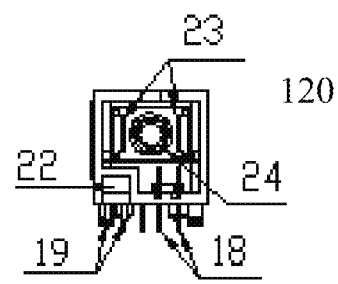
FIG. 13 is a right view of an optical fiber connector adapter according to an embodiment of the disclosure.
Figure 14:
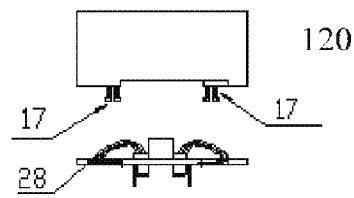
FIG. 14 is a main view of the separated optical fiber connector adapter and bottom cover plate according to an embodiment of the disclosure.
Figure 15:
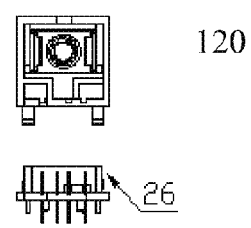
FIG. 15 is a right view of the separated optical fiber connector adapter and bottom cover plate according to an embodiment of the disclosure.
Figure 16:
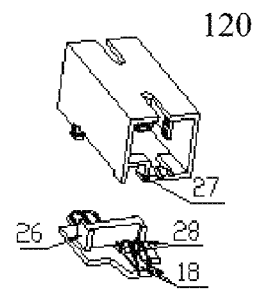
FIG. 16 is a top stereogram of the separated optical fiber connector adapter and bottom cover plate according to an embodiment of the disclosure.
Figure 17:
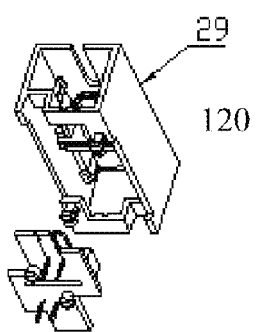
FIG. 17 is a bottom stereogram of the separated optical fiber connector adapter and base plate according to an embodiment of the disclosure.

The technical solution according to embodiments of the disclosure will be clearly and completely described below in combination with accompanying drawings in the disclosure. Apparently, the described embodiments are only a part of the embodiments of the disclosure, rather than all the embodiments. Based on the embodiments of the disclosure, all the other embodiments obtained by those ordinary skilled in the art without creative work, should fall within the scope of the disclosure.

With regard to some defects existed in the art, for example during an optical fiber connection process a port cannot be identified, information cannot be managed in time, an intelligent connection structure is complicated, a traditional SC plug in-position state is unclear, an indicator light is easily blocked during a wiring process, etc., the disclosure provides an optical fiber connector assembly, an optical fiber connector plug, and an adapter assembly. According to the optical fiber connector assembly, a plug information storage chip and a light-guiding pillar are provided in the optical fiber connector plug, and an indicator light and microprocessor connection pins are provided on an adapter base plate. When the optical fiber connector plug is inserted into an adapter fixed on the adapter base plate, the microprocessor determines whether connection is correct by means of the plug information obtained from the plug information storage chip, and outputs the determination result via the light-guiding pillar. A specific implementation process according to the disclosure is explained in detail below in several specific embodiments.

Embodiment 1

The embodiment of the disclosure provides an optical fiber connector assembly for port identification and positioning, which includes an optical fiber connector plug, an optical fiber connector adapter, and an adapter base plate. The optical fiber connector adapter is installed on the adapter base plate and has a plug opening by which the optical fiber connector plug can be inserted into the optical fiber connector adapter. The optical fiber connector adapter may be installed on the adapter base plate in a fixed way, including but not limited to such as welding and the like. Preferably, the optical fiber connector adapter may be installed on the adapter base plate in a detachable way, including but not limited to such as plugging and the like.

FIG. 1 to FIG. 4 are a main view, a top view, a bottom view, and a stereogram of an optical fiber connector plug provided with a plug information storage chip according to an embodiment of the disclosure, respectively. FIG. 5 to FIG. 9 are an exploded main view, an exploded top view, an exploded bottom view, an exploded right view, and an exploded stereogram of an optical fiber connector plug provided with a plug information storage chip and the plug information storage chip according to the embodiment of the disclosure. As shown in FIG. 1 to FIG. 9, a plug information storage chip 12 and an indicator light-guiding pillar 1 are provided in parallel on a bottom side of an optical fiber connector plug 110. All pins of the plug information storage chip 12 are electrically connected to conductive slide rails 14.

FIG. 10 to FIG. 13 are a main view, a top view, a bottom view, and a right view of an optical fiber connector adapter according to the embodiment of the disclosure, respectively. FIG. 14 to FIG. 17 are a main view, a right view, a top stereogram, and a bottom stereogram of an optical fiber connector adapter and a bottom cover plate which are separated according to the embodiment of the disclosure, respectively. As shown in FIG. 10 to FIG. 17, metal elastic pins 18 and an indicator light accommodation portion 22 are provided in parallel on a side of the plug opening of the optical fiber connector adapter 120 which matches with the bottom side of the plug.

Figure 18:
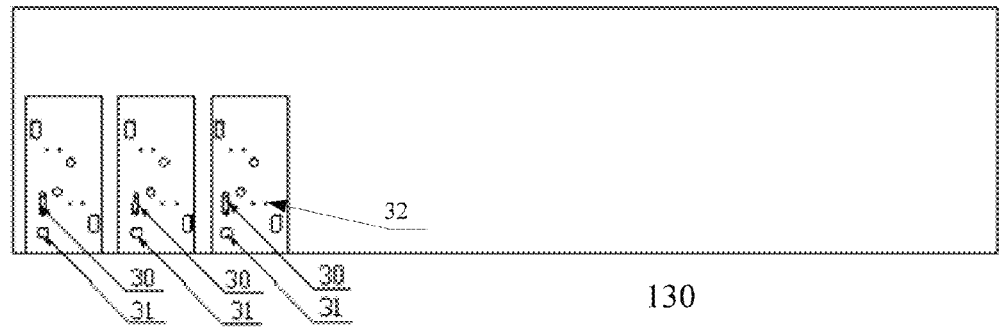
FIG. 18 is a top view of a printed circuit board on the base plate of an optical fiber connector adapter according to an embodiment of the disclosure.
Figure 19:
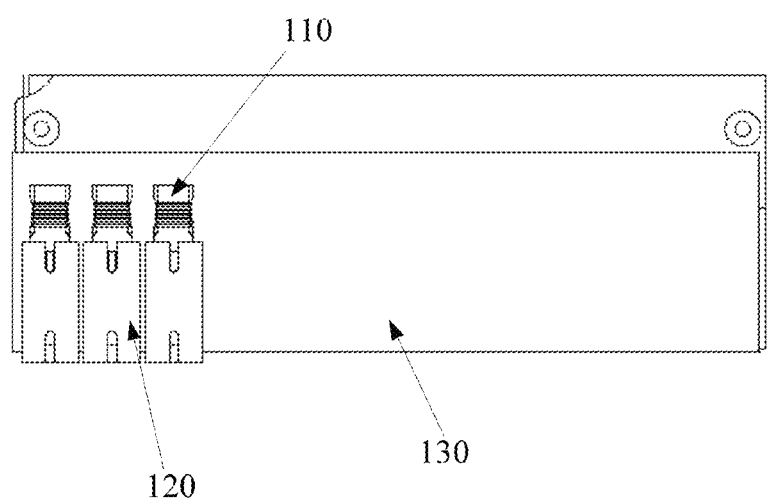
FIG. 19 is an assembly top view of a printed circuit board of an optical fiber connector adapter according to an embodiment of the disclosure.
Figure 20:
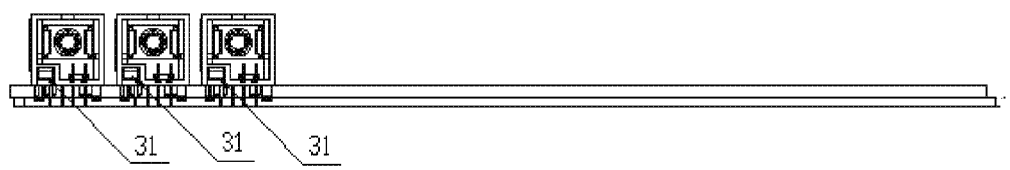
FIG. 20 is an assembly front view of a printed circuit board of an optical fiber connector adapter according to an embodiment of the disclosure.

FIG. 18 is a top view of a base plate for an optical fiber connector adapter having a printed circuit according to an embodiment of the disclosure. FIG. 19 and FIG. 20 are an assembly top view and an assembly front view of the optical fiber connecter adapter and a printed circuit board according to an embodiment of the disclosure, respectively. As shown in FIG. 18 to FIG. 20, pin contacts 32 and an indicator light 31 are provided in parallel on the adapter base plate 130. The pin contacts 32 are connected to an input end of an external microprocessor, and the indicator light 31 is connected to an output end of the microprocessor.

As shown in FIG. 1 to FIG. 20, when the optical fiber connector adapter 120 is installed on the adapter base plate 130, the indicator light 31 is accommodated in an indicator light accommodation portion 22 and the metal elastic pins 18 are electrically connected to the pin contacts 32. When the optical fiber connecter plug 110 is inserted into the optical fiber connector adapter 120 installed on the adapter base plate 130, the metal elastic pins 18 are electrically connected to the conductive slide rails 14, the indicator light-guiding pillar 1 is inserted into the indicator light accommodation portion 22, and abuts against the indicator light 31.

Based on the above main body structure, the disclosure is further explained below in detail in combination with the accompanying drawings and specific embodiments.

Preferably, in this embodiment, in the optical fiber connector plug 110, the plug information storage chip 12 and the conductive slide rails 14 are provided on a printed circuit board 13 on the bottom side of the optical fiber connector plug, wherein the plug information storage chip 12 is deployed on one side of the printed circuit board 13, and the conductive slide rails 14 are deployed on the other side of the printed circuit board 13, and the pins of the plug information storage chip 12 are electrically connected to the conductive slide rails 14 through the printed circuit board 13.

Preferably, in this embodiment, an invaginated hollow boss 7 is provided on the bottom side of the optical fiber connector plug 110, the printed circuit board 13 deployed with the plug information storage chip 12 and the conductive slide rails 14 is fixed in the hollow boss 7.

Preferably, in this embodiment, invaginated guide slots 11 are provided on the hollow boss 7 at positions which match with the conductive slide rails 14, and are used to guide the metal elastic pins 18 to abut against the conductive slide rails 14, when the optical fiber connector plug 110 is inserted into the optical fiber connector adapter 120.

Preferably, in this embodiment, the optical fiber connector plug 110 includes a plug shell 5. Both the hollow boss 7 and the indicator light-guiding pillar 1 are provided on the plug shell 5. Alternatively, the hollow boss 7 is provided on the plug shell 5, and the indicator light-guiding pillar 1 is fixed on a sheath 2 of the plug.

Herein, when the light-guiding pillar is provided on the plug shell 5, an end of the light-guiding pillar protrudes from a lower side of the shell of the connector plug, and the other end of the light-guiding pillar extends to a tail end of a shell of an adapter. As such, this light-guiding pillar can transmit the state of the indicator light at the front end of the plug from the printed circuit on the adapter base plate to the tail end of the sheath of the plug.

Preferably, in this embodiment, the metal elastic pins 18 in the optical fiber connector adapter which are used to scratch and insert into the conductive slide rails 14 preferably have small-angle corners folded at positions of scratching and inserting into the conductive slide rails so as to facilitate point contact with the conductive slide rails; and large-angle corners folded at positions of contacting with the adapter bottom cover plate so as to increase upright elastic force of the pins.

Preferably, in this embodiment, a plug in-position detection portion 30 is further provided on the adapter base plate 130 and is connected to the input end of the microprocessor. A reservation hollow 19 is further provided on the optical fiber connector adapter 120. When the optical fiber connector adapter 120 is installed on the adapter base plate 130, the plug in-position detection portion 30 enters the optical fiber connector adapter 120 through the reservation hollow 19. When the optical fiber connector plug 110 is inserted into the optical fiber connector adapter 120, the plug in-position detection portion 30 is triggered.

In this embodiment, the in-position detection potion 30 is provided to prevent a false insertion of a traditional optical fiber connector plug into the adapter 120. Specifically, when the plug normally provided with the plug information storage chip is inserted into the adapter, the microprocessor detects two signals. One is plug information transmitted from the chip, and the other is plug in-position information transmitted from the plug in-position detection portion 30. At this time, the microprocessor may usually determine whether the false insertion is prevented. However, when the traditional optical fiber connector plug is inserted into the adapter, since there are no chip-level conductive slide rails provided in the traditional plug, the microprocessor can only detect that the plug is inserted at this time, and thus can determine that this plug must be wrongly inserted. At this time, a false insertion alarm may then be sent by controlling an indicator light so that a false insertion of a non-matched plug is prevented.

Herein, the plug in-position detection portion 30 may be but not limited to a detection flicking needle or a micro-switch.

Preferably, in this embodiment, the microprocessor may be placed in a wiring equipment or an external module. The microprocessor is one or more circuits, one or more chips or one or more devices, which transmits a signal for activating or "stimulating" an Electrically Erasable Programmable Read-Only Memory (EEPROM) chip, and receives and decodes information from the activated EEPROM chip. The microprocessor may include a single circuit, chip or device, or may include multiple circuits, chips and/or devices.

Preferably, in this embodiment, the plug information storage chip 12 is preferably an EEPROM chip since the EEPROM chip does not lose data after outage. The information on the EEPROM chip may be erased by means of a computer or dedicated equipment, and may be re-encoded. Thus, its application is very flexible and wide.

Based on the above architecture, in this embodiment, an implementation process for the optical fiber connector assembly to prevent a false insertion in a specific application includes the following steps.

Step 1, a printed circuit board provided with the EEPROM chip is fixed on the hollow boss on a side of the optical fiber connector. The printed circuit board provided with the EEPROM chip includes a micro EEPROM chip, a small printed circuit board, and guide slide rails on the printed circuit board. The printed circuit board can be fixed into the hollow boss of the optical fiber connector plug by building-in, plugging on the side, welding or super glue. The printed circuit board provided with the EEPROM chip is installed in this hollow boss so that a side of the printed circuit board with the chip faces an inner side of the optical fiber connector plug, and two guide slide rails provided by the printed circuit board are installed on an outer side of the hollow boss.

Step 2, when plugging, after two guide slide rails of the printed circuit board provided with the EEPROM chip on the optical fiber connector plug are connected to a peripheral microprocessor through scratching and inserting of metal elastic pins in the optical fiber connector adapter, a pin of the indicator light of the printed circuit board on the adapter base plate is also connected to the microprocessor at the same time. An operator performs reading and/or writing operations on a chip on this optical fiber connector plug via the microprocessor and a control system, and performs lightening scan through the indicator lights of the printed circuit board on the adapter.

Step 3, the indicator lights of the printed circuit board on the base plate of the optical fiber adapter are lightened according to a pre-set connection relationship, to guide the optical fiber connector plug to insert. The indicator light after plugging is displayed at a tail end of the connector plug via the light-guiding pillar. If there is a false insertion, the corresponding indicator light is kept lightened. If the connection is wrong, then the indicator light is not lightened.

Step 4, once all of the chips provided with the EEPROM chip in a wiring system are successively activated, all the connections of jumper wires or tail fibers in the entire wiring system will be identified. This information may be for example stored in a database, displayed on a computer screen, printed in a report, and etc. Thus, intelligent and electronic management of an optical fiber connector port is implemented.

In order to further explain the technical solutions provided by the embodiments of the disclosure, the optical fiber connector assembly according to the disclosure is further explained below in combination with structural schematic views of an optical fiber connector plug and an optical fiber connector adapter.

An optical fiber connector assembly is provided in this embodiment for port identification and positioning, and includes an optical fiber connector plug, an optical fiber connector adapter, and an adapter base plate.

As shown in FIG. 1 to FIG. 20, the optical fiber connector plug 110 includes a light-guiding pillar 1, a sheath 2, a plug shell 5, a ceramic pin 9, a pin dustproof cap 4, an EEPROM chip 12 and a printed circuit 13.

The light-guiding pillar 1 is embedded in the plug shell 5 of the optical fiber connector plug, and extends to a front side of the plug shell 5. When the optical fiber connector plug is inserted into the optical fiber connector adapter, the light-guiding pillar is inserted into an indicator light reservation position 22 on the adapter so as to export a light signal of the indicator light after the indicator light 31 on the adapter base plate is accommodated in the indicator light reservation position 22.

The pin dustproof cap 4 covers a head of the pin 9, and is used to protect an end surface of the pin 9. The plug shell 5 covers a main body of the pin 9 and may slightly slide on the main body of the pin 9. A raised key having a circular front end and a square back end is provided on one side of the plug shell 5. This raised key is a guide key 3, a width and a length of which is suitable for abutting, guiding and positioning of the optical fiber connector plug. There is an inverted "convex" shaped bayonet window on each of two sides of the guide key 3. There are two invaginated shell arc guide rails 6 with and a pin main body inner shell boss 8 in each bayonet window. When the optical fiber adapter plug is inserted, the plug shell 5 slides along the main body of the pin 9 towards the sheath 2, and thus the pin main body inner shell boss 8 may be exposed for latch of the connector.

One side of a chip printed circuit board 13 is welded with an EEPORM chip 12. One of two welding contacts is a data transmission pin of the EEPORM chip 12, and the other one is a ground pin. These two pins are connected to conductive slide rails 10 on the other side of the printed circuit board 13 through a soldering tin hole 14 of the chip printed circuit board 13. The chip printed circuit board 13 assembled with the EEPORM chip 12 is installed in a hollow boss 7 of the optical fiber connector plug. This hollow boss 7 is provided on a side opposite to the guide key 3, close to one edge, while a light-guiding pillar 1 is provided on the other edge, so as to form a structure that the hollow boss 7 and the light-guiding pillar 1 are provided in parallel on the side opposite to the guide key 3. With regard to the hollow boss 7, an outer part of a rectangle opening is big, and an inner part of the rectangle opening is small. There is a barrier plate in the opening near the inner shell boss. There are two micro invaginated guide slots 11 on an outer surface edge of this boss along with the guide key 3. A structure of this hollow boss may causes it to be closely installed with the printed circuit board 13 provided with the EEPROM chip. Moreover, the invaginated guide slots 11 may guide the elastic pins in the optical fiber connector adapter to increase accuracy of scratching and inserting. The structures of the light-guiding pillar 1 and the hollow boss 7 on the optical fiber connector plug 110 provided with the EEPROM chip also fit the described boss structure of the indicator light reservation position 22 on the adapter which, as a light reservation position on the optical fiber connector adapter 120, accommodates the indicator light 31 on the printed circuit board of the adapter base plate. In addition, this boss structure may guarantee the indicator light 31 on the printed circuit board of the adapter base plate to transmit an identification signal to an optical fiber connector plug shell 5 through the light-guiding pillar 1 on the connector plug shell. The printed circuit board 13 provided with the EEPROM chip is fixed on the hollow boss 7 on the optical fiber connector plug through welding or super glue, wherein the EEPROM chip 12 faces an inner side of the optical fiber connector plug shell 5. On the other side, the conductive slide rails 10 and the invaginated guide slots 11 form a slide trace of the elastic pins 18 of the optical fiber connector adapter.

The optical fiber connector adapter 120 is mainly composed of an optical fiber connector adapter dustproof cap 15, an adapter housing 29, a bottom cover plate 16, an indicator light reservation position 22, an in-position detection flicking needle (or a microswitch) reservation hollow 19, chip metal elastic pins 18, two bayonet barbs 23, and a cylinder pin guide cavity 24.

The adapter dustproof cap 15 implements seal protection on a port of the adapter through a raised key on the dustproof cap and an inner rib. A cylinder guide pillar 21 and an elastic fixation pin 17 on a polygon housing bottom cover plate 16 are used to fix the optical fiber connector adapter, and the cylinder guide pillar 21 is used for position limitation and guiding before fixation. There is a horizontally squeezed deformation design on a swapping head of the elastic fixation pin 17 so as to facilitate fixation and detachment between the elastic fixation pin 17 and a plug plate.

There is an optical fiber connector adapter guide groove 14 in an opening at each of two ends of the optical fiber connector adapter 120, a length and a width of which are suitable for guide and position limitation on a guide key 3 of the optical fiber connector plug 110 during a swapping process. The cylinder guide pillar 21 and the elastic fixation pin 17 are fixed on a movable polygon housing bottom cover plate 16 which can be fixed on a lower surface of the optical fiber adapter through super glue or a wilding machine. Before the cover plate is fixed, a housing guide cavity 24 and two bayonet barbs 23 in the optical fiber connector adapter may be assembled into an adapter cavity through this window. Moreover, an I-shaped boss 26 is positioned on a surface of the polygon housing bottom cover plate 16 opposite to the pin 17, and is used to support positions of the adapter guide cavity 24 and bayonet barbs 23. Guide slots and holes of the metal elastic pins 18 used for scratching and inserting the conductive slide rails of the EEPROM chip 12, and position limitation guide grooves 28 at head ends of the elastic pins, are distributed on two sides of the I-shaped positioning boss 26 on the polygon housing bottom cover plate 16. The metal elastic pins 18 are fixed on the polygon bottom cover plate through the guide slots and the holes via mechanical bayonets of the guide slots or the super glue. The indicator light reservation position 22 is fixed through a light hole on the bottom cover plate. The indicator lights 31 on the adapter base plate are positioned on two ports of the optical fiber connector adapter 120 through the adapter bottom cover plate and an adapter edge invaginated guide slot 27.

In the optical fiber adapter 120 according to the disclosure, a skylight opening of the polygon housing bottom cover plate 16 faces openings of the ports on two sides, and is used for fixation of the indicator light 31 on the printed circuit board of the adapter base plate and compatibility with a traditional SC shell. The skylight opening of the polygon housing bottom cover plate 16 forms a right-angle corner on a plane of the adapter elastic fixation pin 17, and is invaginated on a side of the optical fiber connector adapter 120, which guarantees position limitation and fixation of the polygon housing bottom cover plate 16 on the front, back, left, and right. Two bayonet barb guide slots are formed in two inside walls of the optical fiber connector adapter 120. The skylight opening of the polygon bottom cover plate may be accurately installed with the bayonet barbs and a cylinder pin abutting cavity.

As shown in FIG. 18 to FIG. 20, the printed circuit board on the adapter base plate 130 includes the connector plug in-position detection flicking needle 30, an indicator light 31 and pin contacts 32. In the drawing, the indicator light 31 may be a surface mount indicator light welded on the printed circuit board of the base plate, and the connector plug in-position detection flicking needle 30 (or a microswitch) is also welded on the printed circuit board. The indicator light 31 and the in-position detection flicking needle 30 are installed in the optical fiber adapter through an in-position detection flicking needle (or the microswitch) reservation hollow 19 (as shown in FIG. 19).

Specifically, when plugging, the optical fiber connector plug 110 provided with the EEPORM chip is first inserted into a port on one side of the optical fiber connector adapter 120. When the guide key 3 on the optical fiber connector plug 110 is inserted into the adapter along the guide groove 14 of the optical fiber connector adapter 120, the shell 5 on the optical fiber connector plug 110 moves towards the sheath 2 and thus the pin main body inner shell boss 8 may be exposed. Further, two bayonet barbs 23 on the optical fiber connector adapter 120 are locked into the pin main body inner shell boss 8 along two invaginated shell arc guide rails 6 in the bayonet window. The light-guiding pillar 1 on the optical fiber connector plug shell is also inserted into the indicator light reservation hole 22 along with the connector shell 5, and abuts against the indicator light 31. At the same time, protruded portions of the metal elastic pins 18 on the bottom cover plate of the optical fiber connector adapter scratches the conductive slide rails 10 on one side of the printed circuit board 13 provided with the EEPORM chip 12 on the optical fiber connector plug along the invaginated guide slots 11 on the hollow boss of the optical fiber connector adapter plug. The optical fiber connector pin 9 is inserted in a cylinder pin guide cavity 24 of the optical fiber adapter, and latch between the optical fiber connector plug 110 and the optical fiber connector adapter 120 is implemented. During the process of pulling out, when the guide key 3 on the optical fiber connector plug is pulled out of the adapter along the guide grooves 14 of the adapter, the shell 5 on the optical fiber connector plug slides far from the sheath 2, and two bayonet barbs 23 on the optical fiber connector adapter slide far from the sheath 2 along two invaginated shell arc guide rails 6 in the bayonet window. Because a sliding direction is from a low position to a high position of two invaginated shell arc guide rails 6, bayonet portions of two bayonet barbs 23 are jacked up by the high position of the invaginated shell arc guide rails 6 and the bayonet portions of two bayonet barbs 23 are broken away from the pin main body inner shell boss 8. The light-guiding pillar 1 on the optical fiber connector plug shell is also pulled out of the indicator light reservation hole 22 along with the connector shell 5, and thus the light-guiding pillar 1 and the indicator light 31 are separated. Simultaneously, protruded portions of the elastic pins 18 on the bottom cover plate of optical fiber connector adapter slide out of the conductive slide rails 10 on one side of the printed circuit board 13 provided with the EEPORM chip 12 of the optical fiber connector plug 110 and the invaginated guide slots 11 on the plug hollow boss 7 of the optical fiber connector adapter 120. The optical fiber connector pin 9 is broken away from the cylinder pin guide cavity 24 of the optical fiber adapter, and thus the optical fiber connector plug 110 is pulled out of the optical fiber connector adapter 120.

In conclusion, the disclosure provides an optical fiber connector assembly which contains an optical fiber connector plug provided with a plug information storage chip (for example, the EEPROM chip) and the indicator light-guiding pillar, an optical fiber connector adapter provided with the elastic metal pins and the indicator light accommodation portion, and the adapter base plate provided with the indicator light and the pin contacts.

In the assembly, the optical fiber connector plug provided with the EEPROM chip is similar to a universal SC joint structure in that there is a guide raised key on one side of the plug shell with a semi-circular front end and a square back end. There is a "convex" shaped bayonet window on each of two sides of the guide raised key and this bayonet window is composed of two invaginated shell arc guide rails and an inner shell boss. A difference lies in that there is a rectangle hollow boss on a side opposite to the side in which the guide key is located, and an outer part of the rectangle opening is big while an inner part of the rectangle opening is small. There is a barrier plate in the opening near the inner shell boss. Two micro invaginated guide slots are positioned on an outer surface of this step in a direction of the guide raised key. The printed circuit board provided with the EEPROM chip is installed in this hollow boss. The side of the printed circuit board with the chip faces an inner side of the optical fiber connector plug, and two conductive slide rails provided by the printed circuit board are installed on an outer side of the hollow boss. Before installation, this EEPROM chip is welded on one side of the rectangle printed circuit board, and a data pin and a ground pin are connected to two conductive slide rails on the other side through the printed circuit board. On the side in which an EEPROM chip slot position is located, a base plate provided with the indicator light-guiding pillar is protruded from a connector plug shell (or a connector sheath, a shell is used below). The light-guiding pillar at one end of this base plate is protruded from the connector plug shell and the light-guiding pillar at the other end extends to a tail end of the connector shell.

There are symmetric guide grooves at two plug openings of the optical fiber connector adapter, and there are two bayonet barbs in the adapter with a cylinder pin abutting cavity between them. There is a polygon bottom cover plate on an outer side of the adapter opposite to the guide grooves. Adjacent edges of the bottom cover plate at the optical fiber connector adapter port are invaginated towards the adapter to form the opening, and there are two clamping jaws used to fix the printed circuit board of the adapter base plate in the polygon bottom cover plate and an adjacent adapter. There is a "convex" shaped boss in the middle of an upper side of the polygon bottom cover plate. The metal elastic pins which are used to contact the EEPORM chip, and the hollow which is used to accommodate the indicator light and the connector plug in-position detection flicking needle (or the microswitch) fixed by the printed circuit board of the adapter base plate, are fixed on two sides of the boss. There are two guided pillars respectively on two sides of a centre line on a bottom side of the polygon bottom cover plate. Through this polygon bottom cover plate, the bayonet barbs and the cylinder pin abutting cavity may be installed in the optical fiber connector adapter, and then the optical fiber connector adapter is installed on the adapter base plate provided with the plug in-position detection flicking needle (or the microswitch), the indicator light, and a microprocessor connection pin. When inserted into the adapter, the optical fiber connector plug contacts an adapter chip contact metal flicking needle and the in-position detection flicking needle (or the microswitch) through the EEPORM chip and a plug side to perform identification of the optical fiber connector plug, and displays indicator light information provided on the printed circuit board of the adapter base plate on the optical fiber connector plug.

Embodiment 2

This embodiment provides an optical fiber connector plug, and a structure of this plug is also shown in FIG. 1 to FIG. 9.

The plug information storage chip 12 and the indicator light-guiding pillar 1 are provided in parallel on the bottom side of the optical fiber connector plug. All pins of the plug information storage chip 12 are electrically connected to the conductive slide rails 14.

Based on the above main body structure of the plug, several preferred embodiments are given below.

Preferably, in this embodiment, the plug information storage chip 12 and the conductive slide rails 14 are deployed on the printed circuit board 13 provided on the bottom side of the optical fiber connector plug. Herein, the plug information storage chip 12 is deployed on one side of the printed circuit board 13, and the conductive slide rails 14 are deployed on the other side of the printed circuit board 13. The pins of the plug information storage chip 12 are electrically connected to the conductive slide rails 14 through the printed circuit board 13.

Preferably, in this embodiment, the invaginated hollow boss 7 is provided on the bottom side of the optical fiber connector plug 110, and the printed circuit board 13 deployed with the plug information storage chip 12 and the conductive slide rails 14 is accommodated in the hollow boss 7.

Preferably, in this embodiment, the invaginated guide slots 11 corresponding to the positions of the conductive slide rails 14 are provided on the hollow boss 7, and are used to guide the metal elastic pins 18 on the adapter to abut against the conductive slide rails 14 when the optical fiber connector plug 110 is inserted into the optical fiber connector adapter 120.

Preferably, in this embodiment, the optical fiber connector plug 110 includes a plug shell 5. Both the hollow boss 7 and the indicator light-guiding pillar 1 are provided on the plug shell 5. Alternatively, the hollow boss 7 is provided on the plug shell 5, and the indicator light-guiding pillar 1 is fixed on the sheath 2 of the plug.

Preferably, in this embodiment, the plug information storage chip 12 is preferably the EEPROM since the EEPROM chip does not lose data after outage. The information on the EEPROM chip may be erased via a computer or a dedicated equipment, and may be re-encoded. Therefore, the application of the EEPROM is very flexible and wide.

Embodiment 3

This embodiment provides an optical fiber connector adapter assembly configured to be inserted into by the optical fiber connector plug according to Embodiment 2. The optical fiber connector adapter assembly includes an optical fiber connector adapter 120 and an adapter base plate 130. The optical fiber connector adapter 120 is installed on the adapter base plate 130, and has a plug opening by which the optical fiber connector plug is inserted into the optical fiber connector adapter 120. The optical fiber connector adapter 120 may be installed on the adapter base plate 130 in a fixed way, but preferably in an detachable way. The fixed way may be but not limited to such as welding and etc., and the detachable way may be but not limited to such as plugging and etc.

Turning to FIG. 10 to FIG. 20 again, the metal elastic pins 18 and the indicator light accommodation portion 22 are provided in parallel on the bottom side of the plug opening of the optical fiber connector adapter 120.

The pin contacts 32 and the indicator light 31 are provided in parallel on the adapter base plate 130. The pin contacts 32 are connected to an input end of an external microprocessor and the indicator light 31 is connected to an output end of the microprocessor.

When the optical fiber connector adapter 120 is installed on the adapter base plate 130, the indicator light 31 is accommodated in the indicator light accommodation portion 22, and the metal elastic pins 18 are electrically connected to the pin contact 32. When the optical fiber connector plug is inserted into the optical fiber connector adapter installed on the adapter base plate, the metal elastic pins 18 are electrically connected to the conductive slide rails 14 of the optical fiber connector plug, and the indicator light-guiding pillar 1 deployed on the optical fiber connector plug is inserted into the indicator light accommodation portion 22, and abuts against the indicator light 31.

Preferably, a plug in-position detection portion 30 is further provided on the adapter base plate 130 and is connected to the input end of the microprocessor. A reservation hollow 19 is further provided on the optical fiber connector adapter 120. When the optical fiber connector adapter 120 is installed on the adapter base plate 130, the plug in-position detection portion 30 enters the optical fiber connector adapter 120 through the reservation hollow 19. When the optical fiber connector plug 110 is inserted into the optical fiber connector adapter 120, the plug in-position detection portion 30 is triggered. The plug in-position detection portion 30 may be but not limited to the detection flicking needle or the microswitch.

Preferably, in this embodiment, the microprocessor may be placed in a wiring equipment or in an external module. The microprocessor may be one or more circuits, one or more chips, or one or more devices, which transmits a signal for activating or "stimulating" the EEPROM chip, and receives and decodes information from the activated EEPROM chip. The microprocessor may include a single circuit, chip or device, or may include multiple circuits, chips and/or devices.

Apparently, those skilled in the art may make various modifications and alternations on the disclosure without departing from the spirit and the scope of the disclosure. In this way, if these modifications and alternations of the disclosure fall within the scope of the claims of the disclosure and equivalents thereof, then the disclosure may also intend to contain these modifications and alternations.

What is claimed is:

1. An optical fiber connector assembly, comprising: an optical fiber connector plug, an optical fiber connector adapter, and an adapter base plate; wherein the optical fiber connector adapter is installed on the adapter base plate and has a plug opening by which the optical fiber connector plug is inserted into the optical fiber connector adapter;
   a plug information storage chip and an indicator light-guiding pillar are provided in parallel on a bottom side of the optical fiber connector plug; wherein all pins of the plug information storage chip are electrically connected with conductive slide rails;
   metal elastic pins and an indicator light accommodation portion are provided in parallel on a side of the plug opening of the optical fiber connection adapter which matches with the bottom side of the plug;
   pin contacts and an indicator light are provided in parallel on the adapter base plate; wherein the pin contacts are connected to an input end of an external microprocessor, and the indicator light is connected to an output end of the microprocessor; and
   when the optical fiber connector adapter is installed on the adapter base plate, the indicator light is accommodated in the indicator light accommodation portion, and the metal elastic pins are electrically connected to the pin contacts; when the optical fiber connector adapter plug is inserted into the optical fiber connector adapter installed on the adapter base plate, the metal elastic pins are electrically connected to the conductive slide rails, and the indicator light-guiding pillar is inserted into the indicator light accommodation portion and abuts against the indicator light,
   wherein a plug in-position detection portion is provided on the adapter base plate and is connected to the input end of the microprocessor; a reservation hollow is provided on the optical fiber connector adapter, when the optical fiber connector adapter is installed on the adapter base plate, the plug in-position detection portion enters the optical fiber connector adapter through the reservation hollow, and when the optical fiber connector plug is inserted into the optical fiber connector adapter, the plug in-position detection portion is triggered.

2. The optical fiber connector assembly according to claim 1, wherein
   the plug information storage chip and the conductive slide rails are deployed on a printed circuit board provided on the bottom side of the optical fiber connector plug; wherein the plug information storage chip is deployed on one side of the printed circuit board, and the conductive slide rails are deployed on the other side of the printed circuit board, and the pins of the plug information storage chip are electrically connected to the conductive slide rails through the printed circuit board.

3. The optical fiber connector assembly according to claim 2, wherein
   an invaginated hollow boss is provided on the bottom side of the optical fiber connector plug, and the printed circuit board deployed with the plug information storage chip and the conductive slide rails is fixed in the hollow boss.

4. The optical fiber connector assembly according to claim 3, wherein invaginated guide slots are provided on the hollow boss at places which match with the conductive slide rails, and are used to guide the metal elastic pins to abut against the conductive slide rails when the optical fiber connector plug is inserted into the optical fiber connector adapter.

5. The optical fiber connector assembly according to claim 3, wherein the optical fiber connector plug comprises a plug shell; both the hollow boss and the indicator light-guiding pillar are provided on the plug shell; or, the hollow boss is provided on the plug shell, and the indicator light-guiding pillar is fixed on a sheath of the plug.

6. The optical fiber connector assembly according to claim 1, wherein the plug information storage chip is an Electrically Erasable Programmable Read-Only Memory (EEPROM).

7. An optical fiber connector adapter assembly configured to be inserted into an optical fiber connector plug, comprising an optical fiber connector adapter and an adapter base plate; wherein the optical fiber connector adapter is installed on the adapter base plate and has a plug opening by which the optical fiber connector plug is inserted into the optical fiber connector adapter;
   metal elastic pins and an indicator light accommodation portion are provided in parallel on a bottom side of the plug opening of the optical fiber connector adapter;
   pin contacts and an indicator light are provided in parallel on the adapter base plate; wherein the pin contracts are connected to an input end of an external microprocessor, and the indicator light is connected to an output end of the microprocessor; and when the optical fiber connector adapter is installed on the adapter base plate, the indicator light is accommodated in the indicator light accommodation portion, and the metal elastic pins are electrically connected to the pin contacts; when the optical fiber connector plug is inserted into the optical fiber connector adapter installed on the adapter base plate, the metal elastic pins are electrically connected to the conductive slide rails of the optical fiber connector plug, and an indicator light-guiding pillar arranged on the optical fiber connector plug is inserted into the indicator light accommodation portion, and abuts against the indicator light wherein the plug in-position detection is connected to the input end of the microprocessor; a reservation hollow is provided on the optical fiber connector adapter, when the optical fiber connector adapter is installed on the adapter base plate, the plug in-position detection portion enters the optical fiber connection adapter through the reservation hollow; and when the optical fiber connector plug is inserted into the optical fiber connector adapter, the plug in-position detection portion is triggered.

* * * * *